United States Patent [19]
Young

[11] Patent Number: 5,971,840
[45] Date of Patent: Oct. 26, 1999

[54] ABRASIVE PLATE

[76] Inventor: Wayne Young, Allview Ave., Brewster, N.Y. 10509

[21] Appl. No.: 08/810,909

[22] Filed: Mar. 5, 1997

[51] Int. Cl.$^6$ ....................................................... B24B 15/00
[52] U.S. Cl. ............................................. 451/523; 451/552
[58] Field of Search ................................... 451/523, 524, 451/525, 557, 552; 76/101.1

[56] References Cited

U.S. PATENT DOCUMENTS

| | | |
|---|---|---|
| 38,101 | 4/1863 | Earle . |
| 190,115 | 5/1877 | Babcock et al. . |
| 270,384 | 1/1883 | Call . |
| 571,358 | 11/1896 | Gilmore . |
| 1,443,259 | 1/1923 | Graves . |
| 2,403,805 | 7/1946 | Kulla . |
| 2,820,281 | 1/1958 | Amsen . |
| 3,389,447 | 6/1968 | Theobald et al. . |
| 3,509,611 | 5/1970 | Kifer . |
| 3,522,680 | 8/1970 | Sarofeen . |
| 3,528,152 | 9/1970 | Funakubo et al. . |
| 3,545,308 | 12/1970 | Stutzke . |
| 3,583,107 | 6/1971 | Benis et al. . |
| 3,604,490 | 9/1971 | Bricker . |
| 3,869,773 | 3/1975 | Gneiding . |
| 4,028,781 | 6/1977 | Konrad . |
| 4,423,571 | 1/1984 | Selander et al. . |
| 4,989,304 | 2/1991 | Sonefors . |
| 5,056,203 | 10/1991 | Miller . |
| 5,100,506 | 3/1992 | Sturtevant et al. . |
| 5,142,829 | 9/1992 | Germain . |

*Primary Examiner*—Timothy V. Eley
*Attorney, Agent, or Firm*—Dilworth & Barrese

[57] ABSTRACT

An abrasive plate having an abrasive surface for performing abrading applications is provided. The plate includes a base member having a substantially smooth surface with a plurality of holes formed therethrough. A plurality of pairs of spaced apart slots radiate outwardly from each of the holes to define tab members. The tab members may be selectively raised or deformed to protrude from the smooth surface to collectively form an abrasive surface. The number of tabs raised may be selected to control the coarseness of the surface.

16 Claims, 9 Drawing Sheets

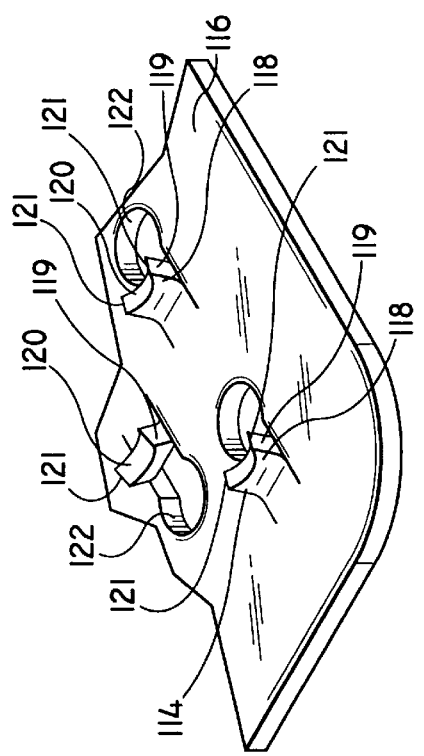
FIG. 7
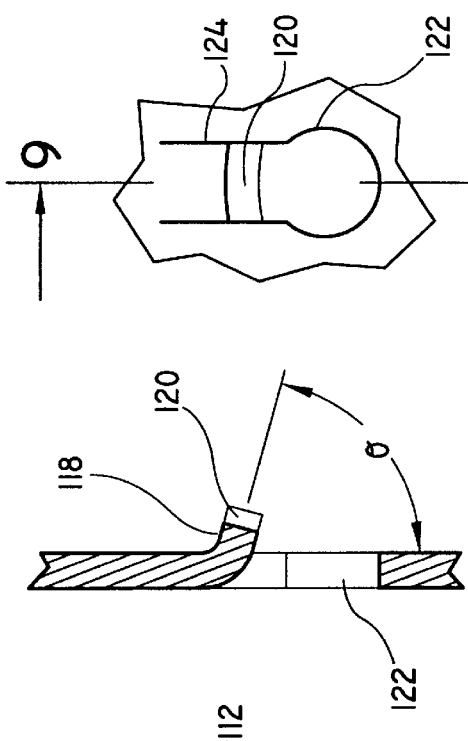
FIG. 8
FIG. 9
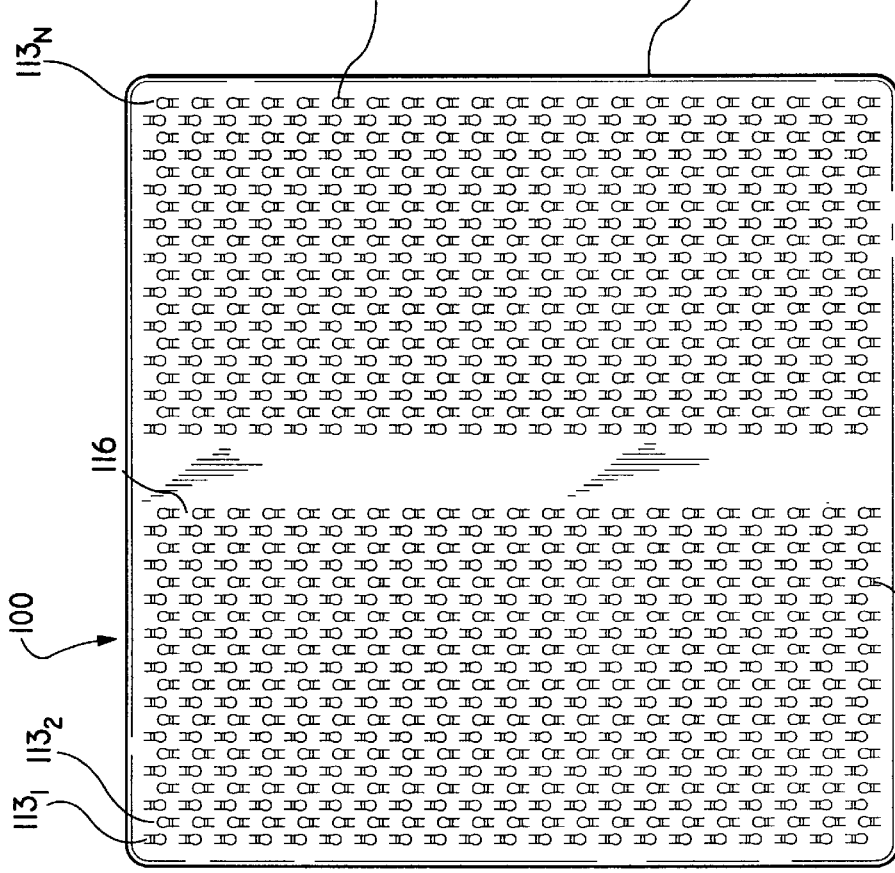
FIG. 6

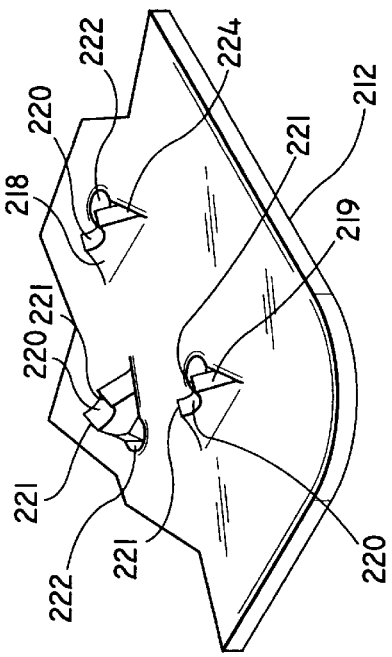
FIG. 12
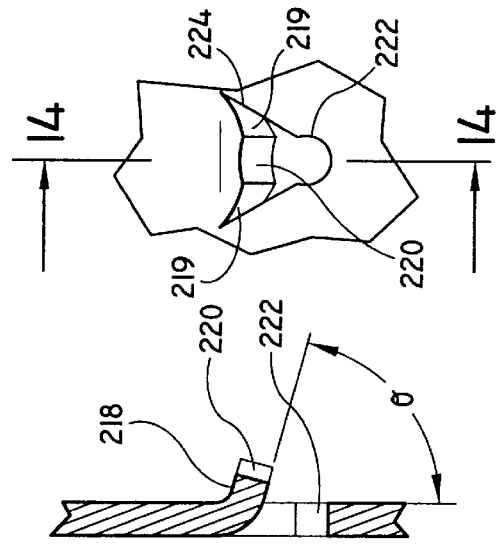
FIG. 13
FIG. 14
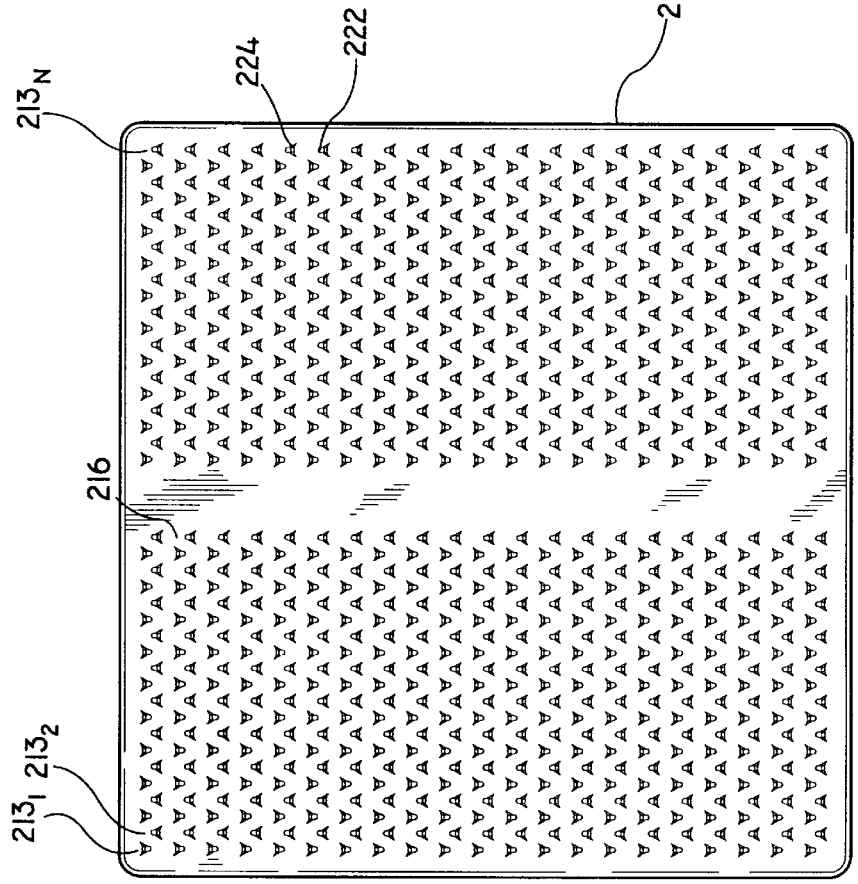
FIG. 11

ABRASIVE PLATE

BACKGROUND

1. Technical Field

The present disclosure relates generally to a unique surfacing tool. More particularly, the present disclosure relates to an abrasive metal plate adapted for use in a sanding machine, and to a method for producing an abrasive metal plate.

2. Background of Related Art

While sandpaper and similar materials are generally inexpensive, they become unserviceable through use in short periods of time. Sandpaper, for example, is easily ruptured as the abrasive particles attached to the base of the sandpaper become loosened, worn and clogged. The use of sandpaper with motor-powered tools exacerbates this problem in that due to the high speed of operation, most of the abrasive particles become quickly clogged with large amounts of wood flour or the particles become detached from the abrasive surface of the sandpaper.

To overcome this problem, abrasive metal sheets have been developed with integrally formed protrusions configured to perform abrading applications. For example, in U.S. Pat. No. 2,820,281, a metallic abrasive sheet is adapted to be used in the manner of sandpaper. The abrasive sheet is flexible so that it may be conformed to supporting blocks. Projections on an abrasive surface are formed by puncturing apertures in the sheet. In U.S. Pat. No. 3,545,308, a perforated abrasive metal sheet is provided for use with a reciprocating sander. The abrasive metal sheet is formed with generally rectangular shaped apertures which are punched in a metal sheet to form an abrasive surface. In U.S. Pat. No. 3,583,107, a flexible metal sheet is suggested for use with power sanders. Cutting edges for the sheet are formed by driving punches of various geometric shapes through the metal sheet.

While abrasive metal sheets have a service life greater than that of sandpaper, these sheets have been found to be more difficult than sandpaper to use with motor-powered sanders, e.g., random orbit sanders, vibratory sanders, etc. Because of the large number of protrusions in the metal sheet, the force transmitted from a surface being treated by the power sander through the plate is generally unbalanced. As such, the power sander has a tendency to pull in one direction as the sander is moved over the surface being treated, making it difficult for an operator to control the power sander and tiresome to operate the sander for sustained periods of time.

Accordingly, a need exists for an abrasive metal sheet adapted for use with motor-powered sanders that overcomes the above-noted disadvantages and is easy to make and use.

SUMMARY

In accordance with the present disclosure, an abrasive surfacing plate, preferably in the form of a perforated metal sheet, is provided. The abrasive plate includes a planar base member having a plurality of transversely aligned rows of protrusions extending from an abrasive face of the base member. Each of the protrusions has a bottom edge portion attached to the base member and a distal edge. The protrusions in each transverse row are oriented substantially identically to the other protrusions in the same transverse row. The protrusions in each row are oriented such that the bottom edge portion of the protrusions are at an angle from about 45° to 135° with respect to the bottom edge portions of the protrusions in each adjacent row.

Each protrusion may have a triangular shaped body in which one side of the body forms the bottom edge portion of the protrusion and the corner of the body opposite to the bottom edge portion forms the distal edge of the protrusion. The base member may have at least one side wall configured to be releasably fastened to engagement structure formed on a power sander. The abrasive plate is preferably monolithically formed from thin stock carbon steel.

The present invention also relates to a method of producing an abrasive plate including the steps of: providing a base member; forming a plurality of rows of protrusions in the base member wherein the protrusions in each respective row have a common orientation and wherein protrusions in each row are oriented such that a bottom edge portion of the protrusions are at an angle from about 45° to 135° with respect to the bottom edge portions of the protrusions in each adjacent row. The method may further include the step of forming at least one side wall substantially perpendicular to the base member adapted to be releasably fastened to engagement structure on a power sander. Preferably, the step of forming the at least one side wall includes rolling an edge portion of the base member to form the side wall.

In an alternative method of producing an abrasive plate, a plurality of holes are formed in a sheet of material having a substantially smooth surface. At least one slot and preferably a pair of slots which extend outwardly from at least some of the holes is also formed in the sheet of material to define tabs. The slots may include a pair of parallel slots to define a tab having a generally rectangular body portion with an arcuate distal end having first and second edge portions. Alternately, the slots may include first and second converging slots which define a tab having a generally triangular body portion with an arcuate distal end having first and second edge portions. Any desired percentage of the tabs may be selectively raised or deformed to protrude above the substantially smooth surface thereby forming an abrasive surface. The number of tabs raised may be chosen to control the coarseness of the abrasive surface of the abrasive plate; e.g., raising a low number of tabs produces a coarse abrasive surface, while raising a higher number of tabs produces a finer abrasive surface.

The abrasive plate described herein provides increased service life over sandpaper and similar materials and may be adapted to be used with conventional power sanders without being affected by the drawbacks associated with known abrasive plates. In addition, the abrasive plate can advantageously be manufactured in volume in an efficient manner.

BRIEF DESCRIPTION OF THE DRAWINGS

Preferred embodiments of the invention are described hereinbelow with reference to the drawings wherein:

FIG. 6 is a top view of the abrasive plate shown in FIG. 5;

FIG. 7 is a perspective cutaway view of a portion of the abrasive plate shown in FIG. 5;

FIG. 8 is a top cutaway view of a portion of the abrasive plate shown in FIG. 5;

FIG. 9 is a cross-sectional view taken along section line 9—9 of FIG. 8;

FIG. 11 is a top view of the abrasive plate shown in FIG. 10;

FIG. 12 is a perspective cutaway of a portion of the abrasive plate shown in FIG. 10;

FIG. 13 is a top cutaway view of a portion of the abrasive plate shown in FIG. 10; and FIG. 14 is a cross-sectional view taken along section line 14—14 of FIG. 13.

DESCRIPTION OF THE PREFERRED EMBODIMENTS

Figure 1A:
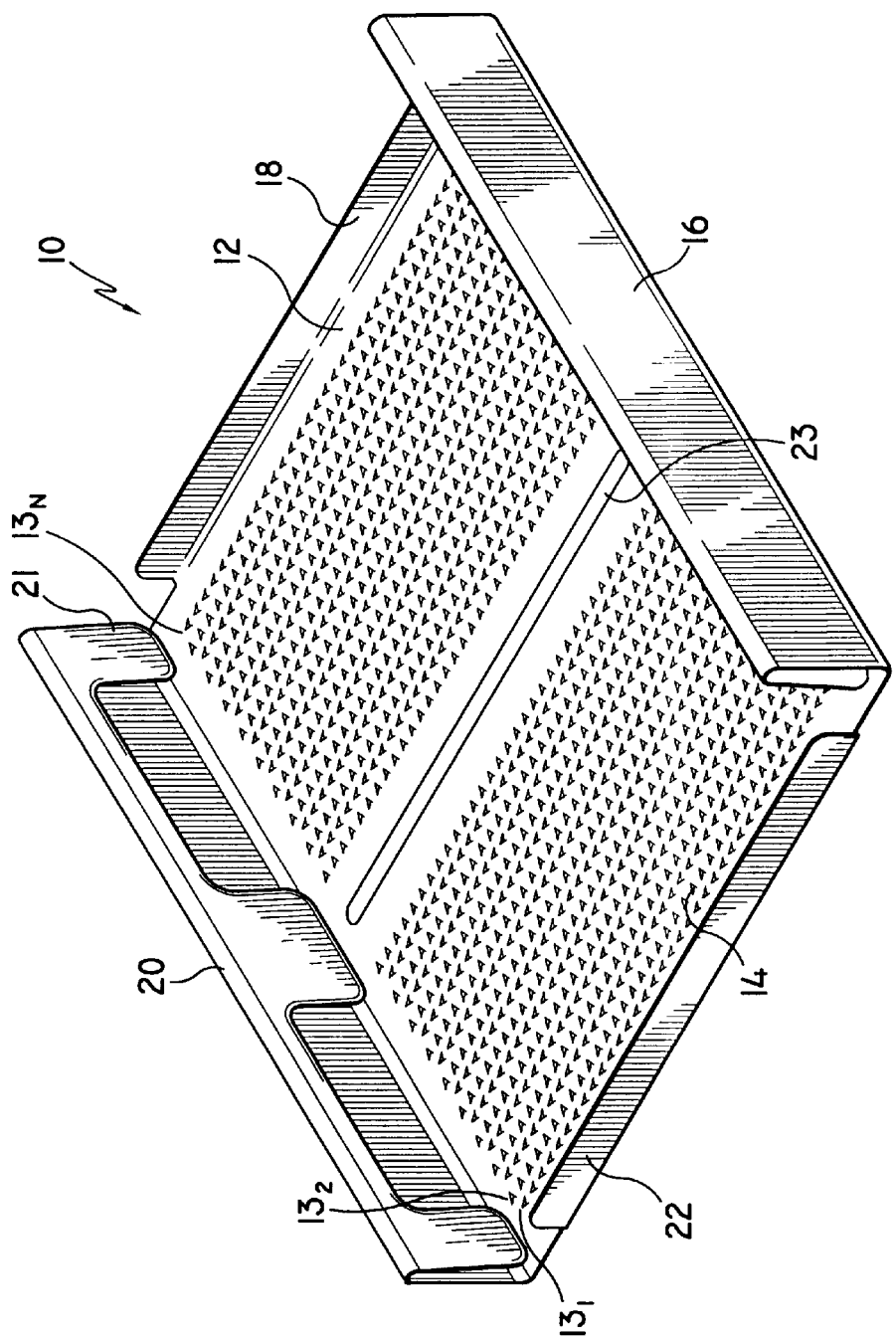
FIG. 1A is a schematic perspective view of an abrasive plate made in accordance with the present invention.

Preferred embodiments of the presently disclosed abrasive plate will now be described in detail with reference to the drawings, in which like reference numerals designate identical or corresponding elements in each of the several views.

Figure 1B:
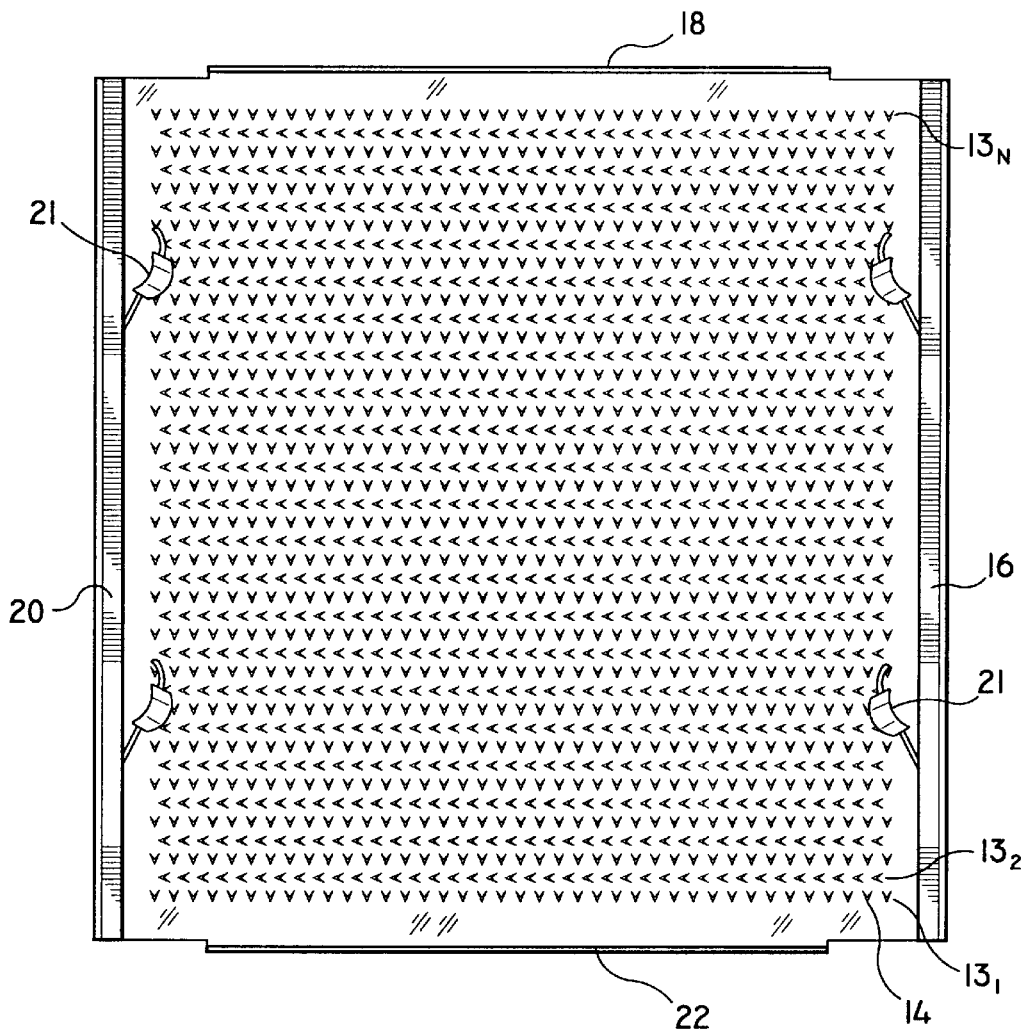
FIG. 1B is a schematic top view of an alternate embodiment of the abrasive plate of the present invention.
Figure 1C:
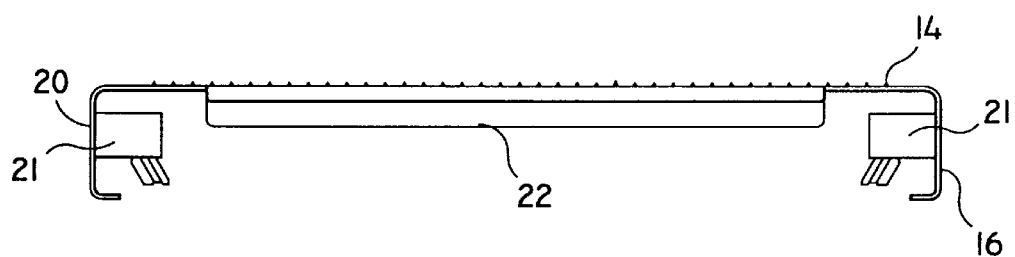
FIG. 1C is a schematic front elevational view of the abrasive plate shown in FIG. 1B.

Referring to FIGS. 1A–1C, an abrasive plate shown generally as 10 includes a base member 12 having multiple rows $13_1$–$13_N$ of protrusions 14 (where N refers to the highest number row of a plurality of consecutively numbered rows). Protrusions 14 extend outwardly from the abrasive plate 10 to collectively form an abrasive surface on base member 12. Preferably, the abrasive plate 10 is constructed from thin stock carbon steel and has a rectangular shape, although other materials having the requisite strength requirements may be used to construct the plate and the plate 10 may take any desired shape.

Abrasive plate 10 is formed with side walls 16, 18, 20 and 22. The sidewalls are configured to be releasably fastened to engagement structure of a power sander or other device commonly used for holding sandpaper and the like (not shown). Side walls 16 and 20, for example, may include resilient fingers 21 which engage recesses or other structure disposed on a power sander to secure the plate 10 to the sander. The resilient fingers 21 may be formed by double folding a portion of sidewalls 16 and 20 (FIG. 1A) or by providing tabs in sidewalls 16 and 20 (FIGS. 1B and 1C). The resilient fingers 21 facilitate quick and easy removal and attachment of abrasive plate 10 from a power sander.

The abrasive plate 10 may be monolithically formed from a sheet of material, e.g., thin stock carbon steel. Preferably, sidewalls 16, 18, 20 and 22 are formed by folding the edges of the base member 12 to a position substantially perpendicular to the base member. In particularly useful embodiments, the abrasive plate 10 may be about 0.020 inches thick. The plate can be dimensioned to be adaptable to ¼, ⅓ or ½ sheet power sanders currently available in the market. The abrasive plate 10 may also include one or more stiffening ribs 23 formed on the surface of the base member 12 to reinforce the plate and prevent flexing of base member 12. Although only one rib 23 is shown, a plurality of ribs at various orientations or positions may be provided.

Figure 2:
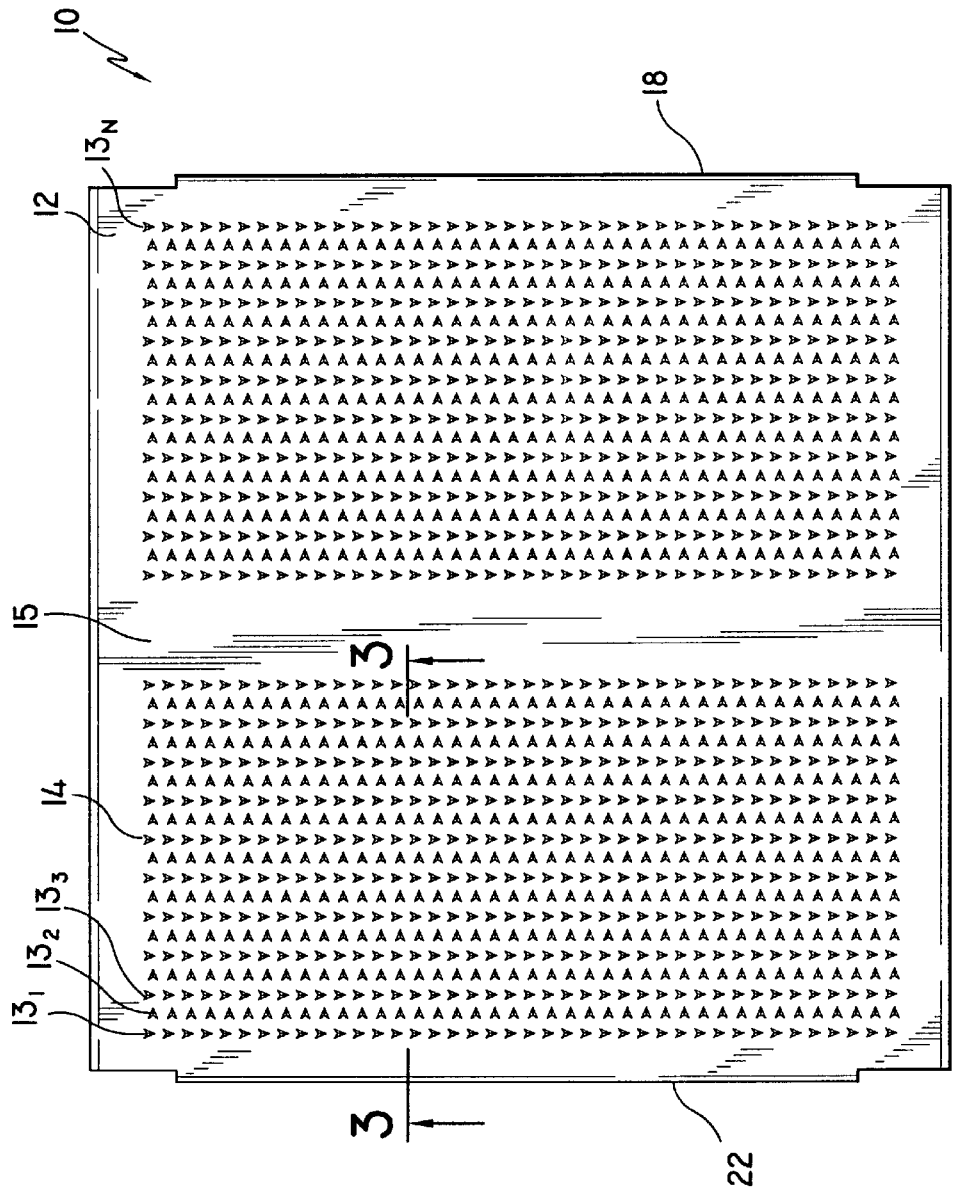
FIG. 2 is a schematic bottom view of the abrasive plate of FIG. 1A.

Referring now to FIG. 2, a plurality of rows $13_1$–$13_N$ of protrusions 14 are formed in the base plate 10. The protrusions 14 are formed such that each protrusion 14 in a row $13_i$ (where i refers to an exemplary row of the plurality of rows) of protrusions 14 has substantially the same orientation as other protrusions 14 in that row. The protrusions 14 in adjacent rows are oriented such that a bottom edge portion of the protrusions are at a predetermined angle from about 45° to about 135° with respect to the bottom edge portions of the protrusions in row $13_i$. By varying the orientation of the protrusions 14 in adjacent rows in the manner described above, the forces transmitted through the abrasive plate 10 during operation of a power sander may be substantially balanced to eliminate or substantially reduce pulling of the power sander in any one direction during a sanding operation.

Figure 3:
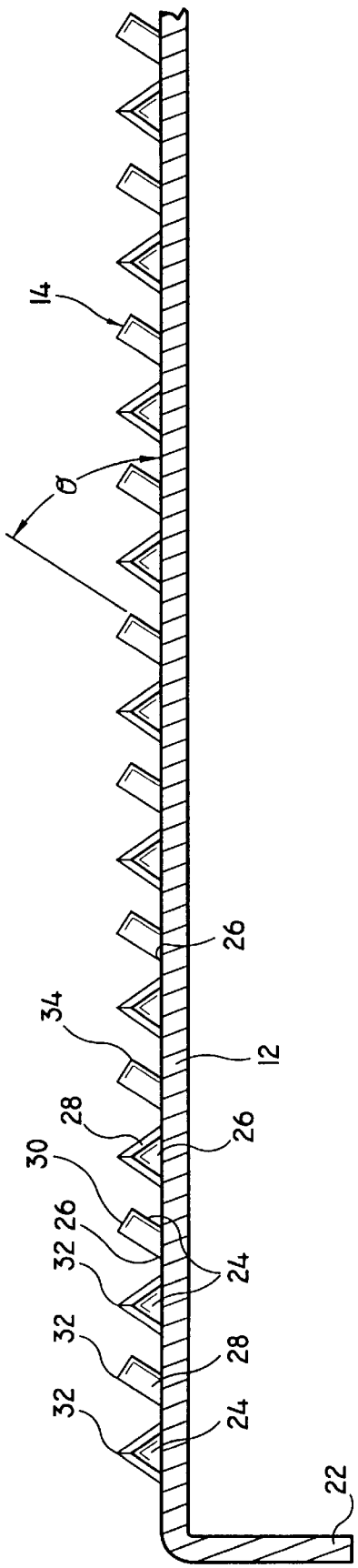
FIG. 3 is a schematic side cross-sectional view of the abrasive plate taken along section line 3 of FIG. 2.

In an illustrative embodiment of the present invention shown in FIG. 3, each of the protrusions 14 is triangularly-shaped and includes a planar face 24, a bottom edge portion 26 attached to the base member 12, a side wall 28, and a distal edge 30. The protrusion 14 is formed such that the planar face 24 and the base member 12 define an angle θ of about 60° to about 120° (see also FIG. 4). The protrusions 14 may be formed having a height of from about 0.005 to about 0.1 inches. The specific dimensions of the abrasive plate 10 and of the protrusions 14 will vary according to the intended use of the plate 10.

Figure 4:
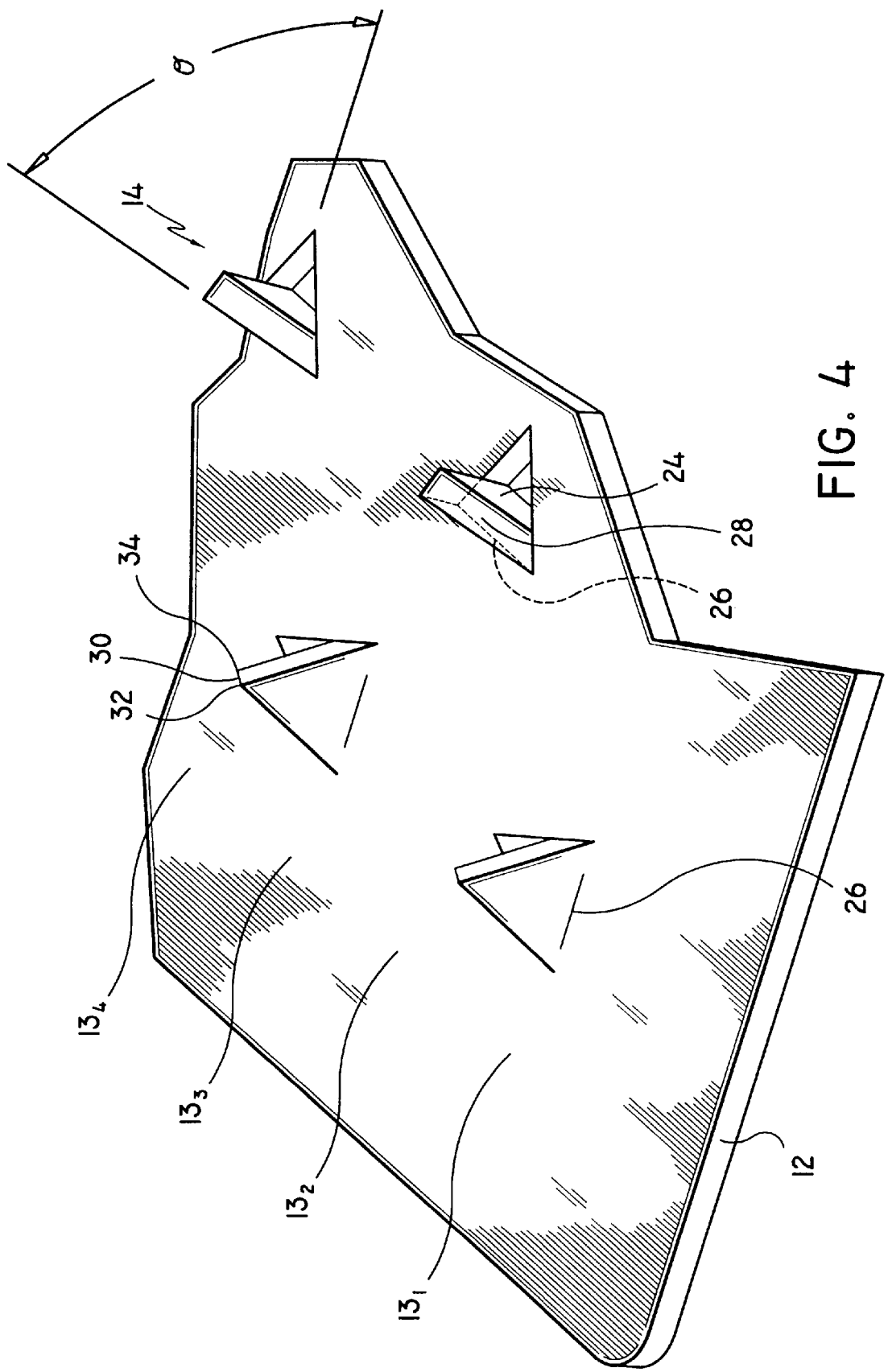
FIG. 4 is a schematic perspective view showing details of the protrusions of the abrasive plate of FIGS. 1A–1C.

Referring now to FIG. 4, in a preferred embodiment of the disclosure, the bottom edge portions 26 of protrusions 14 in each row are oriented at an angle of approximately 90° with respect to the bottom edge portions 26 of the protrusions 14 in adjacent rows. The bottom edge portions 26 of the protrusions 14 in alternate rows (i.e., row $13_i$ and row $13_{i+1}$ may be rotated 180° and still provide a balanced power sanding device.

Preferably, the protrusions 14 are formed in a single sheet of material using a mechanical punch having a desired shape to form the rows $13_1$–$13_N$ of protrusions 14. As stated above, each protrusion 14 in a row of protrusions is formed having a substantially identical orientation to the other protrusions 14 in that row. The bottom edge portions 26 of the protrusions 14 in each row are oriented at an angle of about 45° to about 135° with respect to the bottom edge portions 26 of the protrusions in adjacent rows. The edges of the abrasive plate are mechanically shaped via rolling and cutting into a configuration adapted to be fastened to engagement structure formed on a power sanding device.

In use, the abrasive plate 10 is fastened to a power sanding device by fastening the sidewalls 16, 18, 20 and 22 to engagement structure on the power sanding device such that the abrasive surface of the abrasive plate 10 faces away from the sanding device. The abrasive surface is pressed against the surface to be treated and the power sanding device is actuated to cause the abrasive surface to move relative to the surface being treated. If the angle θ defined by the planar surface 24 of the protrusions 14 and base member 12 is 90°, the entire distal edge 30 of the protrusion will engage the surface being treated. For all other angles, the leading point 32 or the trailing point 34 of the protrusions 14 will first engage the surface being treated.

Figure 5:
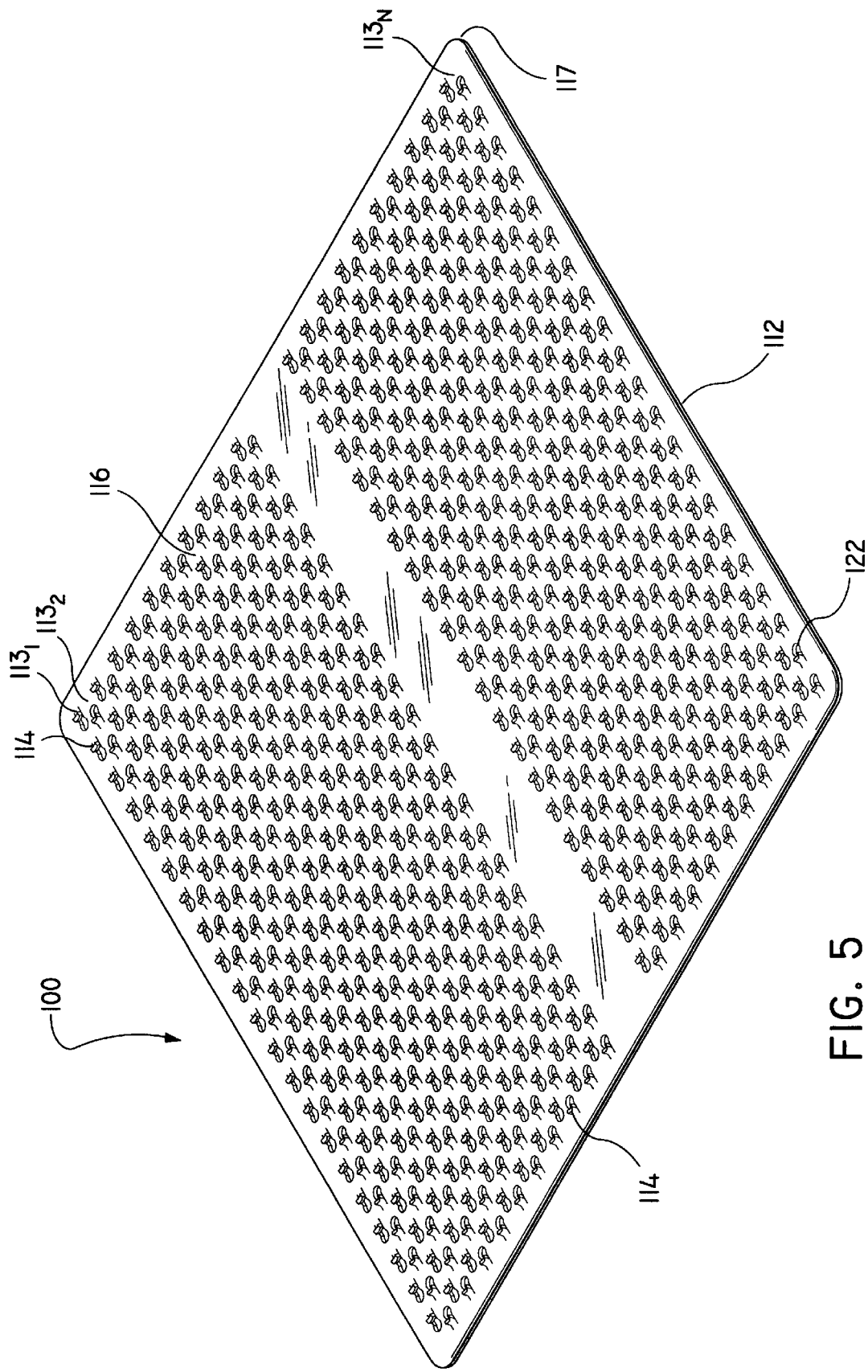
FIG. 5 is a perspective view of another embodiment of the abrasive plate.
Figure 10:
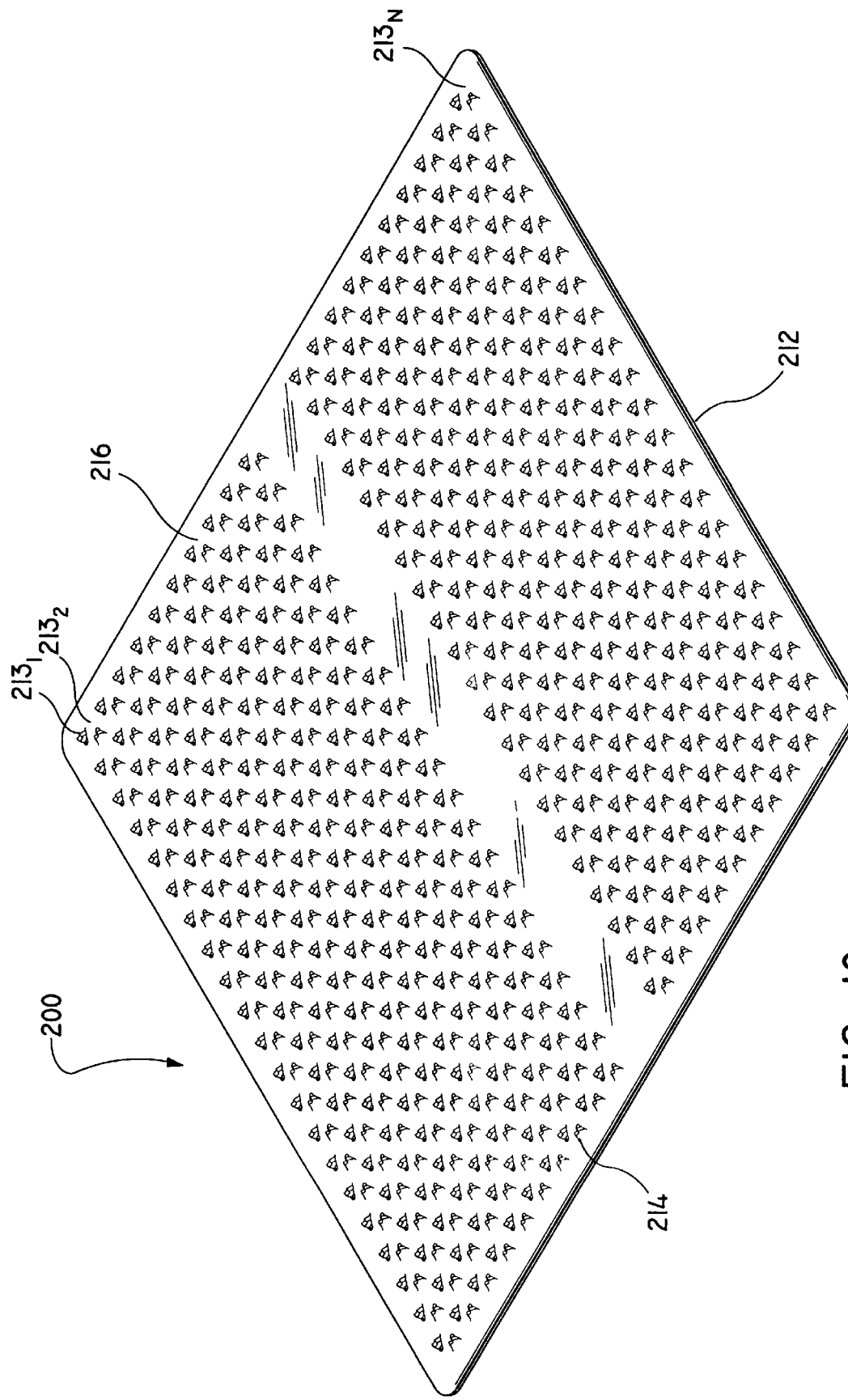
FIG. 10 is a top perspective view of another embodiment of the abrasive plate.

A further embodiment of the presently disclosed abrasive plate shown generally as 100 will now be described with reference to FIGS. 5–9. Referring to FIGS. 5 and 6, abrasive plate 100 includes a base member 112 having multiple rows $113_1$–$113_N$ of protrusions 114 extending outwardly therefrom to collectively form an abrasive surface 116. Preferably, abrasive plate 100 is monolithically constructed from thin stock carbon steel and has a generally rectangular shape, although other materials having the requisite strength requirements and having different shapes (e.g., circular, triangular, etc.) may also be used to construct abrasive plate 100. Although not illustrated, abrasive plate 100 may include fastening structure, such as sidewalls 16 (FIG. 1A), configured to releasably engage engagement structure of a power sander or other device commonly used to support sandpaper and the like. Preferably, abrasive plate 100 includes hook and loop fasteners (not shown), such as Velcro®, to secure the plate 100 to supporting structure. The corners 117 of base member 112 are preferably rounded to remove all sharp edges from the plate 100.

Referring also to FIGS. 7–9, protrusions 114 extend outwardly from surface 116 and define an angle θ of (FIG. 9) from about 30° to about 150° with respect thereto. Preferably, angle θ is in the range of about 60° to about 85°. Each protrusion 114 has a body portion 118 attached to base member 112 having a pair of linear sidewalls 119 and an arcuate or concave distal wall 120 having a pair of edge portions 121. Each protrusion 114 is preferably commonly oriented with respect to other protrusions in the same row, while protrusions 114 in adjacent rows have orientations which are offset with respect to each other, and are preferably offset by about 180°.

Preferably, plate 100 is manufactured by forming a plurality of holes 122 in a sheet of material having a substantially smooth surface. At least one slot and preferably a pair of slots 124 which extend outwardly from each of the holes 122 is also formed in the sheet of material to define tab members. After the holes 122 and slots 124 are formed in base member 112, some or all of the tab-members may be deformed or raised to protrude from the smooth surface to define protrusions 114. The number of tab members raised may be chosen to control the coarseness of abrasive surface 116. Those skilled in the art will appreciate and it is further contemplated that in an alternate embodiment (not shown), multiple pairs of slots 124 can be formed in the base member which slots extend outwardly from each hole 122 to define multiple tab members about each hole 122. Subsequently, some or all of the multiple tab members formed at each hole may be selectively deformed to form protrusions 114 and provide abrasive surface 116 having a desired coarseness.

It is noted that any known apparatus may be used to form the holes 122 and slots 124 in base member 112 and to deform the tab members. For example, holes 122 may be drilled into base member 112 and slots 124 may be punched through base member 112, or both holes 122 and slots 124 may be formed using a laser. It should be understood that the slots need not extend entirely through the bore member, but can merely be score lines that provide a line of weakness along which the tab members are subsequently punched out. Moreover, a punch may be used to raise the tab members to form protrusions 114. By providing holes 122 in base member 112, the tip of the punch used to raise the tab members can be inserted into one of the holes 122 such that a side portion of the punch deforms the tab member. This eliminates high loads on the tip of the punch and greatly increases its useful life.

As illustrated in FIGS. 5–9, body portion 118 of protrusion 114 may have a substantially rectangular shape. However, protrusions having other shapes are also envisioned. Referring to FIGS. 10–14, an alternate embodiment of the abrasive plate is shown generally as 200. Briefly, abrasive plate 200 includes a base member 212 having multiple rows 213₁–213ₙ of protrusions 214 extending outwardly therefrom to collectively defined abrasive surface 216. Protrusions 214 extend outwardly from abrasive surface 216 to define an angle θ (FIG. 14) of from about 30° to about 150° with respect thereto. Each protrusion 214 includes a body portion 218 attached to base member 212, a pair of linear sidewalls 219 and an arcuate or concave distal wall 220 having a pair of edge portions 221. Body portion 218 has a generally triangular shape, although other shapes may also be used. Preferably, each protrusion 214 is commonly oriented with the other protrusions in the same row, whereas protrusions 214 in adjacent rows have orientations which are offset from each other and are preferably offset by about 180°. It is noted that abrasive plate 200 may be manufactured using a process similar to that described to manufacture abrasive plate 100. However, the pair of slots 124 which extend outwardly from each of holes 122 are formed parallel to each other, whereas the pair of slots 224 which extend outwardly from each of holes 222 converge toward the respective hole 222.

As in the previous embodiment, it is further contemplated that more than one pair of slots can be formed at each hole. In this manner, a plurality of tabs can be produced around some or all of the holes. By raising or inclining all of the tabs formed, a fine abrasive surface is produced. By raising less than all the tabs, a coarser abrasive plate is provided.

It will be understood that various modifications may be made to the embodiments disclosed herein. For example, the abrasive plate may be adapted to be fitted onto a manual sanding block, or constructed in belt form having a thickness of from about 0.005 to 0.060 inch such that it may be fitted on a belt sander. As another example, the pair of slots which define the tab members need not be linear but may be curved or angled to define tab members having a variety of shapes. As yet another example, rather than forming round holes as illustrated at 122 and 222, in FIGS. 5–14, holes of other configurations (e.g., squares, rectangular, triangular, oval, etc.) can be used. Therefore, the above description should not be construed as limiting, but merely as exemplifications of preferred embodiments. Those skilled in the art will envision other modifications within the scope and spirit of the claims appended hereto.

What is claimed is:

1. An abrasive plate comprising:
   a base member having a substantially smooth surface and defining a plurality of holes through the base member;
   at least one pair of slots formed in the base member adjacent at least one of said holes, each pair of slots and one of said plurality of holes defining a tab, the tab having a distal surface defining at least two abrading edges; and
   wherein the tab is inclined relative to the smooth surface of the base member to define an abrasive surface.

2. An abrasive plate according to claim 1, wherein the at least one pair of slots includes first and second parallel slots defining the tab, the tab having concave distal end.

3. An abrasive plate according to claim 2, wherein the tab is inclined at an angle from about 30° to about 150° with respect to the smooth surface of the base member.

4. An abrasive plate according to claim 1, wherein each pair of slots includes first and second slots which converge toward a respective hole to define the tab, the tab having a generally triangular body portion with an concave distal end.

5. An abrasive plate according to claim 4, wherein the tab is inclined at an angle from about 30° to about 150° with respect to the smooth surface of the base member.

6. An abrasive plate according to claim 1, wherein at least some of the plurality of holes are substantially circular.

7. An abrasive plate according to claim 6, wherein the tab has a distal surface defining a concavity.

8. An abrasive plate comprising:

a base member having a plurality of protrusions formed thereon, each protrusion having a body portion having a pair of linear sidewalls and a concave distal end having first and second abrading portions, the abrading portions defining an abrasive surface.

9. An abrasive plate according to claim 8, wherein the protrusions are inclined at an angle from about 30° to about 150° with respect to the surface of the base member.

10. An abrasive plate according to claim 9, wherein the protrusions are inclined at an angle of about 75°.

11. An abrasive plate according to claim 9, wherein the linear sidewalls are parallel to each other.

12. An abrasive plate according to claim 9, wherein the linear sidewalls converge with each other in the direction of the arcuate distal end.

13. An abrasive plate according to claim 8, wherein the base member includes a plurality of substantially circular openings which extend through the base member and at least one pair of slots, each slot extending through the base member and intersecting one of said openings, wherein each protrusion is defined by one of said pair of slots and one of said openings.

14. An abrasive plate comprising:

a base member having a substantially smooth surface defining a plane and a plurality of tab members formed therein;

wherein at least some of the tab members are inclined with respect to the plane defined by the smooth surface of the base member to define an abrasive surface, and at least some of the tab members lie within the plane parallel to the smooth surface of the base member.

15. An abrasive plate according to claim 14, wherein the inclined tab members are inclined at an angle of about 30° to about 150°.

16. An abrasive plate according to claim 15, wherein the inclined tab members are inclined at an angle of about 75°.

* * * * *